C. J. OLSON.
PNEUMATIC SAW.
APPLICATION FILED FEB. 3, 1909.
982,851.
Patented Jan. 31, 1911.
2 SHEETS—SHEET 1.
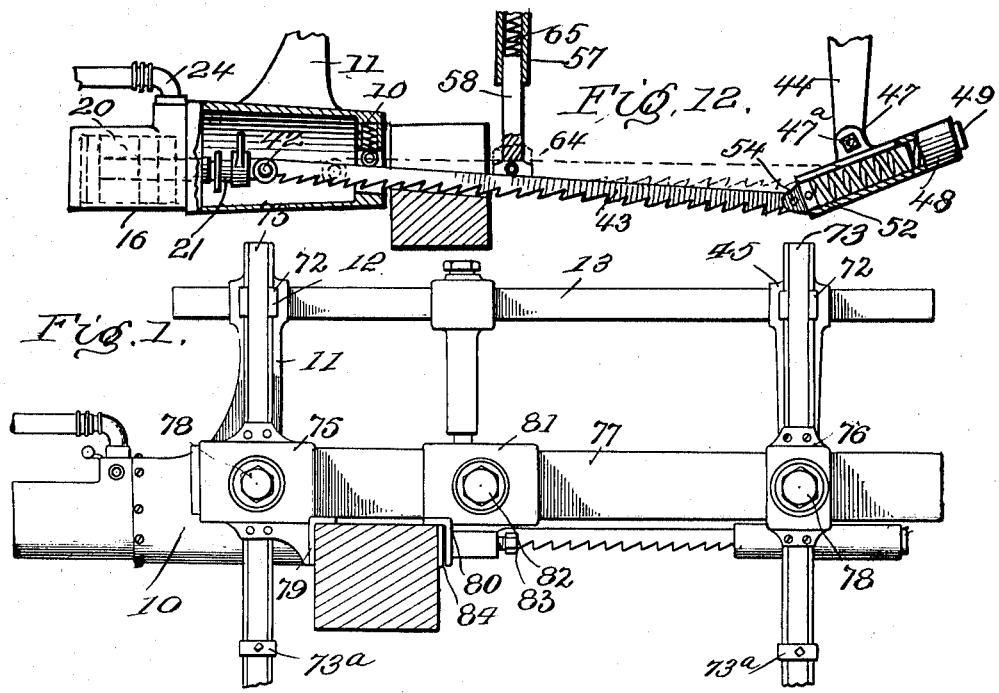
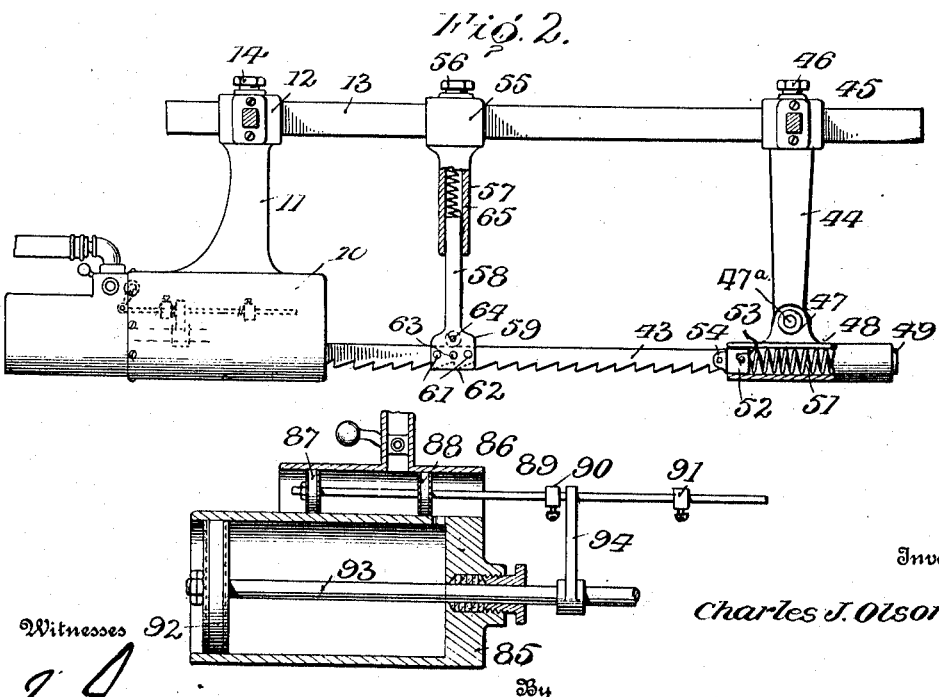
Inventor
Charles J. Olson

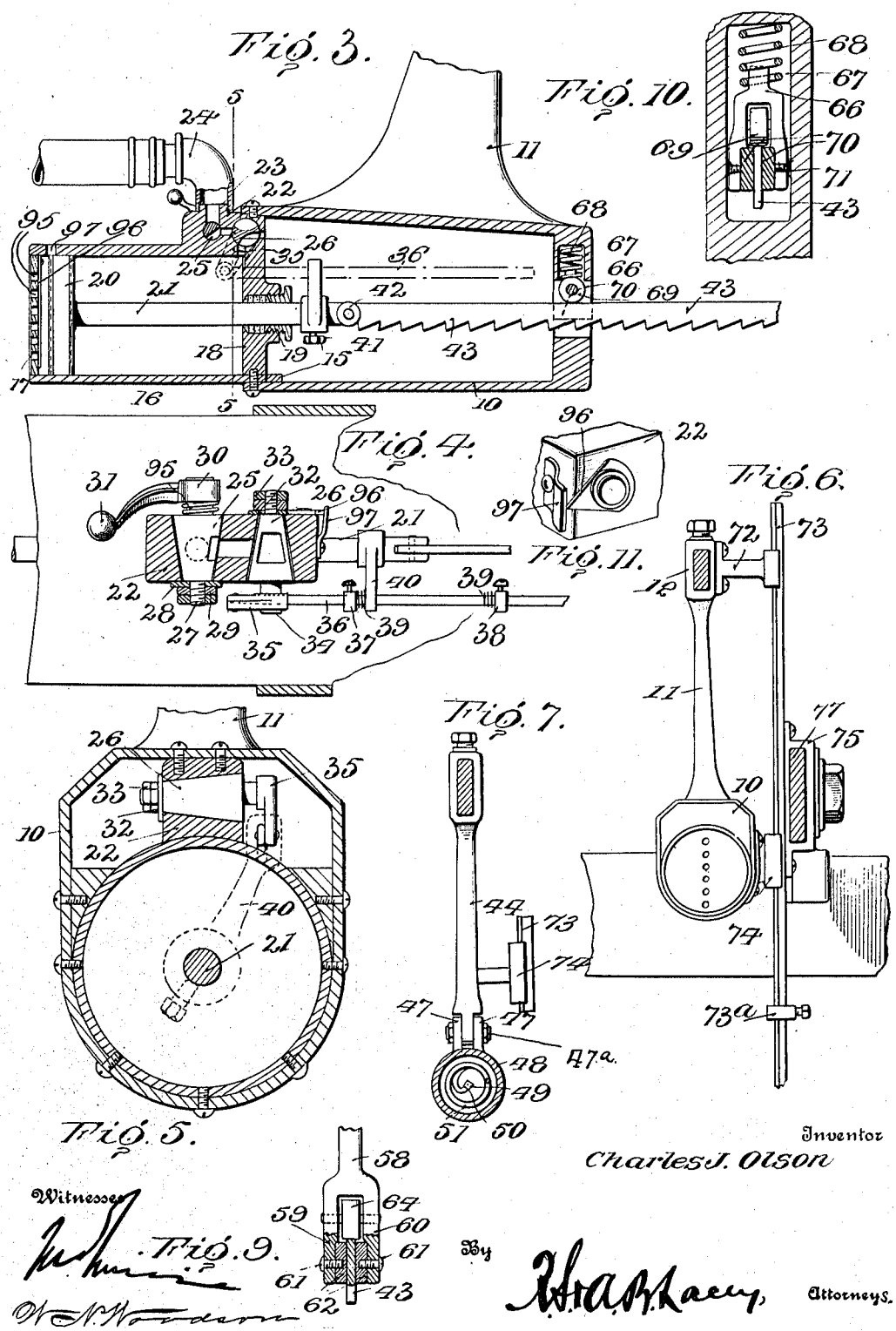

UNITED STATES PATENT OFFICE.

CHARLES J. OLSON, OF MUSKEGON, MICHIGAN.

PNEUMATIC SAW.

982,851.

Specification of Letters Patent.   Patented Jan. 31, 1911.

Application filed February 3, 1909. Serial No. 475,828.

*To all whom it may concern:*

Be it known that I, CHARLES J. OLSON, citizen of the United States, residing at Muskegon, in the county of Muskegon and State of Michigan, have invented certain new and useful Improvements in Pneumatic Saws, of which the following is a specification.

This invention relates to metal and wood working tools and has particular reference to an implement in that class of devices which are known as hacksaws.

An object of this invention is to provide a hacksaw with means whereby the same may be actuated by means of compressed air or the like, and which is of such construction that the operator may control the supply of air to the same by means of a thumb lever positioned adjacent the hand grasp.

Another object of this invention is the provision of means by which the stroke of the saw may be varied in vibration incident to the character of the work which is to be performed by the same, as in cutting metallic bodies the saw must be adjusted for slight vibration only, but where soft materials as wood or the like are being operated upon, the saw may be given a greater stroke. This feature of the invention is effected by the provision of a vertically adjustable reciprocating member for pivotally supporting the forward or outer end of the saw.

The invention has for a further object the provision of means for actuating an intake valve which is employed in connection therewith for regulating the stroke of the saw by the employment of the fluid under pressure. In this connection the invention provides for the quick and positive operation of the valve in the end of the saw so that the piston employed in connection with the device will have no back pressure to overcome as the same is reciprocated.

A still further object of this invention is the provision of an improved saw guide which prevents the lateral vibration of the saw during its reciprocation and which is also constructed so as to follow the saw during the downward stroke of the same.

In conjunction with these objects the invention further aims to produce a device which may be adjusted to different lengths to accommodate the reception of saws of various lengths, and a device which is provided with means for supporting the same at the required angle upon the work to be operated upon.

For a full understanding of the invention reference is to be had to the following description and accompanying drawings, in which, Figure 1 is a side elevation of the complete device as applied to a beam. Fig. 2 is a side elevation of the device having the work supporting guide removed therefrom, partly shown in section. Fig. 3 is an enlarged detail view of the casing and cylinder in section. Fig. 4 is a horizontal section through the valve casing. Fig. 5 is a section on the line 5—5 of Fig. 3. Fig. 6 is an end elevation of the complete device, partly disclosed in section. Fig. 7 is a detail partly in section of the forward standard and saw connection to the same. Fig. 8 is a side elevation of the cylinder and valve mechanism disclosing a modification of the same. Fig. 9 is a detail in section of the saw guide. Fig. 10 is a detail of the saw guide employed in the forward end of the casing. Fig. 11 is a detail perspective of the cam operating means for the inlet and exhaust valve. Fig. 12 is a longitudinal section through the device as applied to a beam to be cut.

Corresponding and like parts are referred to in the following description and indicated in all the views of the drawings by the same reference characters.

Referring to the drawings, the frame of the device includes a casing 10 which is preferably of cylindrical formation and which is provided upon its upper face with a standard 11 which is reduced at its upper extremity and provided with a sleeve 12. The sleeve 12 is preferably of rectangular formation and is slidably positioned upon one end of a bar 13 forming the upper portion of the frame and secured in adjusted position thereon by means of a suitable set-screw 14 which is carried in the upper side of the sleeve 12. The casing 10 is flared outwardly at its rear extremity and is provided with an annular shoulder 15 about the inner face thereof adjacent the lower extremity against which is fitted the forward end of a cylinder 16. The cylinder 16 is provided at its rear end with a head 17 for closing the same and at its forward end with a head 18 through which is centrally located a stuffing box 19. Within the cylinder 16 a piston 20 is provided which carries a piston rod 21 which extends forwardly therefrom and is engaged through the stuffing box 19. The upper side of the cylinder 16 is provided with an integrally formed valve casing 22 which is provided with an upwardly projecting and threaded flange 23 for the reception of the end of a pipe 24 for the purpose of conveying air under compression to the valve casing 22. The flange 23 is formed about the end of a channel which is vertically disposed at the rear end of the valve casing 22 and which is terminated in a transverse bore formed for the reception of a plug valve 25. The transverse bore formed in the valve casing 22 is tapered to conform to the contour of the valve 25 and is communicated with a second transverse tapered bore at the forward end of the casing 22 which is oppositely disposed and in which is oppositely positioned a tapered valve 26. The valve 25 is provided upon its reduced extremity with a threaded valve stem 27 which is extended beyond the side of the casing 22 and which is provided with a collar 28 rigidly positioned upon the same against the side of the casing 22 and held in such position by means of the lock nuts 29. The valve 25 is provided in the usual manner with an intermediate cut-away portion at one side thereof for the purpose of admitting fluid from the pipe 24 through channels formed in the casing 22 into the forward end of said cylinder. The opposite or enlarged extremity of the valve 25 is provided with a stem 30 upon which is detachably secured a thumb lever 31 which is of convenient formation so as to admit of the positioning of the same in a convenient manner for the ready engagement of the operator. The reduced extremity of the valve 26 is likewise provided with a collar 32 and lock nuts 33 for the purpose of securing the same adjustably within the transverse bore at the forward end of the casing 22. The enlarged end of the valve 26 is provided with a laterally extended valve stem 34 upon which is secured a depended arm 35 which is pivotally connected at its lower extremity to a valve rod 36. The valve rod 36 is slidably mounted at its forward extremity in the front wall of the casing 10 and is provided intermediate of its length with two collars 37 and 38 which are adjustably secured thereon in spaced relation by means of set-screws in any common and well-known manner. The collars 37 and 38 are provided upon their inner opposite faces with helical springs 39 for the purpose of deadening the shock to the valve 36 incident to the striking of an abutment 40 which is carried by the piston rod 21 and loosely engaged at its upper end about the valve rod 36 between the collars 37 and 38. The abutment 40 which is carried by the piston rod 21 and which is reciprocated thereby and caused to actuate the valve rod 36, by reason of its reciprocation, is adjustably secured upon the outer extremity of the piston rod 21 by a suitable set-screw 41 disposed upon the same.

The forward extremity of the piston rod 21 is flattened and forked as at 42, between the fork arms of which is pivotally mounted a suitable saw 43 which extends forwardly beyond the casing 10.

The bar 13 is extended forwardly from the standard 11 and carries a second standard 44 at its opposite extremity which is adjustably secured upon the same by means of a sleeve 45 and a set-screw 46. The lower extremity of the standard 44 is reduced and flattened for the reception of the ears 47 which are upwardly extended in parallel from a tube 48 carried thereby and are secured to the standard 44 by means of a clamping bolt 47ª. The tube 48 is longitudinally positioned beneath the bar 13 and is adapted for angular adjustment upon the extremity of the standard 44 for the purpose which will be hereinafter set forth. The tube 48 is provided at its forward extremity with a plug 49 which is fitted into the same for threaded engagement therein and which is provided upon its inner face with an eye 50 for the reception of the forward extremity of a coil spring 51 which is longitudinally positioned within the tube 48. A block 52 which is of disk formation is loosely fitted within the rear extremity of the tube 48 and connected to the rear extremity of the spring 51 through the medium of an eye 53. The block 52 is provided upon its rear face with fork arms 54 between which is pivotally secured the forward extremity of the saw 43.

Intermediately positioned upon the bar 13 is a third sleeve 55 which is adjustably positioned thereon by means of a set-screw 56. The sleeve 55 is provided with a depended hollow shank 57 into which is fitted an arm 58 which is forked and flattened at its lower extremity to form the fork arms 59 and 60. The fork arms 59 and 60 are apertured near their opposite ends through which are loosely positioned set-screws 61 which carry plates 62 disposed against the opposite inner faces of the fork arms 59 and 60. The fork arms 59 and 60 are provided with threaded apertures intermediate of their lower edges which are in registered relation and into which are fitted set-screws 63, which are impinged at their inner extremities against the outer faces of the plates 62. The saw 43 is slidably positioned between the plates 62 and are prevented from lateral vibration by means of the same.

A roller 64 is positioned between the inner extremities of the fork arms 59 and 60 and is adapted for engagement upon the upper edge of the saw 43 to prevent the frictional engagement of the same with the arm 58 upon the reciprocation of the saw 43. A spring 65 is positioned upon the upper extremity of the arm 58 within the shank 57 and is adapted to hold the roller 64 in engagement with the upper edge of the saw 43.

The casing 10 is provided with a guide which comprises an arm 66 which is inserted in the bored projection 67 formed upon the front of the casing 10 and is held downwardly by means of a spring 68 against the upper edge of the saw 43. The arm 66 is forked at its lower extremity and is provided with a roller 69 for engagement with the saw 43 and the plates 70 which are held in adjusted relation against the sides of the saw 43 by means of the set-screws 71.

In connection with this device I employ a guide for the purpose of supporting the frame and the saw at the desired angle across the upper face of the portion of the material which it is adapted to cut. The guide comprises arms 72 which are laterally extended from the sleeves 12 and 45 and which are headed and provided with T-shaped grooves for engagement with guides 73 which are vertically disposed in parallel relation with the standards 11 and 44. The lower extremities of the guides 73 are engaged by heads 74 which are disposed upon the sides of the casing 10 and the standards 44 respectively. The lower extremities of the guides 73 are provided with stop collars 73ᵃ which are adjustably secured thereon by means of suitable set-screws and are employed for the purpose of preventing the heads 74 from sliding downwardly and being disengaged from the guides 73 as the saw 43 is carried through the portion of material. The guides 73 are each provided with channel members 75 and 76 which are positioned adjacent their lower extremities and through which is slidably disposed a supporting bar 77 which is adjustably secured in the channel members by means of suitable set-screws 78. The channel member 75 is provided with a corner iron 79 for engagement with the upper corner of a beam or the like which is adapted to be cut and which coöperates with a second corner iron 80 disposed upon a sleeve 81 which is adjustably disposed upon the supporting bar 77 by means of a set-screw 82. The corner iron 80 is provided with a set-screw 83 which extends inwardly from the side thereof and which swivelly supports a plate 84 for engagement against the side of the beam or the like positioned between the corner irons 79 and 80 for the purpose of clamping the same rigidly in position.

In the modification disclosed in Fig. 8, the cylinder 85 is provided with an adaptable valve mechanism hereinafter set forth for the introduction and the exhaust of the compressed fluid. The cylinder 85 is provided upon its upper face with a cylindrical casing 86 in which are positioned pistons 87 and 88 which are held in spaced parallel relation with one another by means of a valve rod 89 which projects outwardly from the same and upon which are positioned two collars 90 and 91 in spaced relation. The piston 92 in the main cylinder 85 is provided with a piston rod 93 which extends forwardly therefrom and carries a forwardly extended abutment 94 which engages about the valve rod 89 and alternately strikes the collars 90 and 91 during the reciprocation thereof. A port is formed between the cylinder 85 and the casing 86 through which is adapted to pass the compressed fluid as it passes in and out of the cylinder 85 during the movement of the piston 92. In this construction when the piston 92 is in its normal position in the forward end of the cylinder 85 the piston 88 is positioned forward of the port formed in the cylinder 85 and the fluid under compression passes from the casing 86 through the port into the cylinder 85 and forces the piston 92 rearwardly within the cylinder. As the piston 92 reaches the rear extremity of the cylinder the abutment 94 is caused to strike the collar 90 and to carry the pistons 87 and 88 backwardly in the casing 86 and to shut off the supply of compressed fluid and at the same time to cause the communication of the port with the atmosphere and to thereby allow the piston 92 to return in the cylinder 85 under the action of the spring 51.

In the preferred form of the invention hereinbefore set forth the valve 25 is provided with a spring 95 which is positioned about the stem 30 and secured at one extremity to the valve casing 22, while its opposite extremity is secured to the stem 30, for the purpose of normally holding the valve 25 in a closed position. The valve casing 22 is provided with a port which extends from the forward extremity thereof into the upper forward end of the cylinder 16 for the purpose of admitting of the escape of the compressed fluid when the valve 26 is opened. For this purpose the valve 26 is provided upon its opposite sides with cut-away portions intermediate of its length to cause the registration of the channels which are formed from the feed pipe 24 and the exhaust respectively.

For the purpose of effecting the quick operation of the valve 26 when the valve rod 36 is actuated to operate the valve 26, the collar 32 is provided with a cam 96 which is provided with opposite straight edges diverged from the point of the cam and which are adapted for engagement with a leaf spring 97 disposed upon the side of the casing 22 and engaged with said cam 96. The employment of this cam produces the instantaneous operation of the valve 26 for the reason that when the valve rod 36 is given a slight longitudinal movement the arm 35 revolves the valve 26 a slight distance which is sufficient to carry the center of the cam 96 beyond the central point of the spring 97, which thereby produces a lateral pressure of the spring 97 upon the cam 96 to rotate the same until the spring 97 engages one of the sides of the cam. This action takes place upon either the opening or the closing of the valve 26 as the spring 97 is alternately engaged with the straight sides of the cam 96.

The operation of the device is as follows:—The device is positioned about a beam or the like. Corner irons 79 and 80 are engaged upon the upper opposite edges of the same and secured in such position by the rotation of the set-screw 83 which clamps the plate 84 against the side of the beam and holds the guide in position. When in this position the heads which are carried by the sleeves 12 and 45 and by the casing 10 and standard 44, are disposed upwardly upon the guides 73 to position the saw 43 upon the upper face of the beam. The operator now depresses the thumb lever 31 to rotate the valve 25 and admit the compressed air or other fluid into the valve casing 22. According to the construction of the device the spring 51 holds the piston 17 in the forward end of the cylinder 16 and holds the valve 26 in such position as to open communication between the feed pipe 24 and the cylinder 16. As the compressed air enters the casing 22 it is immediately conveyed to the cylinder 16 and engaged against the piston 20 which causes the same to travel backwardly within the cylinder. This action causes the piston rod 21 to draw the saw backwardly against the tension of the spring 51 and at the same time to carry the abutment 40 backwardly where it is caused to engage with the collar 37 and to carry the rod 36 therewith for a slight distance by which act the arm 35 is caused to swing the valve 26 into an open position to release the compressed liquid. The spring 97 at this point causes the cam 96 to instantly operate the valve 26 and to release the compressed air before the piston 17 has started to return. As the compressed air is released from confinement the spring 51 is allowed to exert its tension upon the saw 43 and to carry the same forwardly, carrying also the piston 17 and abutment 40. The abutment 40 strikes the sleeve 38 in its forward movement and causes the actuation of the rod 26 to admit of a fresh supply of compressed air within the cylinder 16.

When it is desired to effect an adjustment of the tube 48 the clamping bolt 47ᵃ is released and the tube 48 is swung into a slight oblique angle, the open end of the same being moved downwardly. The tube 48 when thus adjusted guides the block 52 in an inclined direction to carry the outer end of the saw 43 through a vertical plane during its longitudinal movement. This motion causes the saw 43 to swing about the arms 42 and to engage the teeth of the saw 43 consecutively across the upper face of the work and thus cut the work at an inclined plane. It will also be observed that the action of the saw produces a rounded cut surface on the work to further the cutting action, as the points of the surface to be cut are thus consecutively brought into engagement with the teeth of the saw, whereby but a short length of surface is presented to be cut at each instant instead of the entire width of the work. As the frame which supports the saw 43 cannot move out of its vertical plane, but is fed downwardly upon the work by gravity, the saw must be given a vibratory movement at one end to produce such rocking motion. This rocking motion mechanically produces the action of a hand-saw when operated by a carpenter, who raises and lowers the end of the saw to which the handle is attached during the longitudinal reciprocation of the saw. As the forward end of the saw is depressed the arm 58 is retained against the upper edge of the saw 43 by the tension of spring 65 positioned in the upper hollow portion of the shank 57. The plates 62 are adjusted to engage the opposite sides of the saw 43 by means of the set-screws 61 and 63 according to the thickness of the saw employed. If a saw 43 is employed which is of greater length than the one shown in the device, the sleeves 12 and 45 are spaced along the bar 13 and secured in adjusted position to admit of the positioning of such saw.

The head 17 is provided with a plurality of apertures 95 over which is positioned a portion of flexible material 96 upon the inner side of the head 17 to admit air, by reason of the suction caused by the piston 20 and the consequent displacement of the material 96, to the cylinder upon the forward stroke of the piston 20 under the action of the spring 51. This is for the purpose of permitting of the free movement of the piston 20 when returning to the forward end of the cylinder 16. When the air is admitted to the forward end of the cylinder 16 the piston 20 is thrust backwardly and causes a compression of the air within the cylinder and closes the openings 95 by engaging the strip 96 up against the head 17. Air is now permitted to escape only through the opening 97, and a cushion is therefore formed within the cylinder to prevent the sudden jar or termination of the stroke which would result, and thereby damage the machine.

Having thus described the invention, what is claimed as new is:—

1. In a hacksaw, the combination of a frame, a saw mounted in said frame and adapted for longitudinal movement therein, means carried at the rear of said frame and connected to said saw for operating the same and a pivoted forward portion connected to said saw for regulating the downward stroke of the same.

2. A device as specified comprising a frame, a saw longitudinally positioned in said frame, a tube pivotally mounted at the forward end of said frame, a spring positioned in said tube connected to said saw for normally retaining the same in a forward position, a cylinder disposed at the rear of said frame adapted to receive a fluid under pressure, a piston mounted in said cylinder and connected to the rear end of said saw for drawing the same backwardly, a guide positioned on said frame in engagement with said saw adapted for longitudinal adjustment upon the same, and a second guide carried by said frame for supporting the same upon the work.

3. A device as specified comprising a longitudinally adjustable frame, a saw mounted in said frame, a tube pivotally disposed in the forward end of said frame for engagement with said saw to adjust the downward stroke of the same, a cylinder mounted at the rear of said frame, a piston disposed in said cylinder and connected to said saw, valves positioned adjacent said cylinder for admitting a fluid under pressure into said cylinder to retract said piston and for exhausting the compressed fluid upon the return of said piston, a guide longitudinally positioned on said frame for engagement with said saw to prevent the lateral vibration of the same and a second guide carried by said frame for engagement with the work to support the device in relation to the same.

4. A device of the class described comprising a frame, a saw mounted in said frame for longitudinal movement therein, a piston disposed in the rear extremity of said frame connected to said saw for vibrating the same, a tube adapted to carry the forward end of said saw adjustably mounted in the forward end of said frame, said tube adapted to regulate the stroke of said saw and a guide adjustably positioned on said frame for engaging the opposite sides and upper edge of said saw to prevent the same from lateral vibration during the operation.

5. A hacksaw comprising a bar, standards depended from said bar and adapted for longitudinal adjustment upon the same, a tube pivotally disposed upon the lower extremity of the forward of said standards, a spring disposed in said tube, a saw secured at its forward end to said spring, a casing positioned upon the lower extremity of the rear of said standards and means positioned on said casing in engagement with the rear extremity of the said saw for the purpose of longitudinally vibrating the same.

6. A device as specified comprising a bar, standards adjustably positioned on said bar and depended therefrom, a casing carried by one of said standards, a pivoted portion disposed upon the opposite of said standards, heads disposed at one side of said casing, and at one side of the opposite of said standards, heads positioned upon the upper extremities of said standards, vertically disposed guides slidably engaged in the T-slots formed in said heads, channel members positioned upon the outer faces of said guides, a bar adjustably secured to said channel members, a sleeve slidably disposed intermediately of said bar, corner irons carried by one of said channel members and said sleeve for engagement with work to secure the device thereto, a set screw carried by said sleeve, a plate swivelly disposed upon the inner extremity of the set screw for engagement with the work to clamp the same in position, a saw mounted between the lower extremities of said standards and means carried by said casing and said pivoted portion for reciprocating said saw.

7. A device as specified comprising two guides vertically disposed in parallel, a bar positioned across said guides for adjustably supporting said guides across the upper face of the material to be cut, standards carried by said guides adapted for vertical slidable adjustment upon the same, a bar adjustably secured in the upper extremities of said standards and a saw longitudinally disposed across said standards at the lower extremities thereof, said saw adapted for longitudinal reciprocation.

8. In a device as specified, the combination with two standards vertically disposed in parallel, a bar adjustably positioned across the upper extremities of said standards, a saw disposed between the lower extremities of said standards, means carried by said standards for reciprocating said saw, guides positioned in parallel with the said standards upon the sides thereof, said guides adapted for slidable adjustment with said standards and means carried by said guides for securing the same to materials to be cut.

9. A device as specified comprising a bar, standards slidably disposed on said bar, a saw mounted between the lower extremities of said standards and adapted for longitudinal reciprocation between the same, means carried by said standards for actuating said saw, a shank adjustably positioned on said bar intermediately thereof, and depended therefrom, an arm slidably engaged in the lower hollow end of said shank, a spring disposed in said shank against the upper end of said arm, a roller carried in the lower extremity of the said arm for engagement upon the upper edge of said saw, fork arms extended downwardly from said arm about said saw, plates adjustably secured in said fork arms, for engaging the opposite sides of said saw and means for securing said standards upon materials to be cut.

10. A device of the class described comprising a bar, standards depended from the opposite extremities of said bar, a tube pivotally disposed upon the lower extremity of the forward of said standards, a plug positioned in the forward end of said bar, a spring carried by said plug, a block loosely engaged in the rear end of said tube and connected to said spring, a saw disposed between said standards, the forward end of said saw being engaged with said block, a casing disposed upon the lower end of the rear of said standards, a cylinder mounted at the rear of said casing, a piston disposed in said cylinder, a piston rod extended forwardly from said piston into said casing, and connected to said saw, valves disposed at the forward end of said cylinder for admitting and exhausting air under compression to said cylinder, a guide slidably disposed on said bar for engagement with said saw to prevent lateral vibration of the same and a second guide carried by said standards adapted for engagement with material to be cut to support said saw in operative relation thereto.

11. A device as specified including a frame, a saw positioned in the lower portion of said frame, means carried by said frame for actuating said saw, a tube pivotally engaged in the forward end of said frame, said tube adapted for adjustment in a vertical plane to adjust the stroke of the saw, and a spring carried in said tube connected to said saw for normally holding the same in a forward position.

12. A device as specified including a bar, standards depended from said bar adapted for longitudinal adjustment upon the same, a spring carried at the lower end of one of said standards, a piston mounted in the lower extremity of the rear of said standards, a saw connected between said piston and said spring and means for admitting air under pressure against said piston to actuate the same.

In testimony whereof I affix my signature in presence of two witnesses.

CHARLES J. OLSON. [L. S.]

Witnesses:
ANDREW DOWD,
C. B. BRADEN.